April 16, 1963 F. SCHÖFER 3,086,183
ELECTROMECHANICAL FILTER
Filed June 1, 1959 2 Sheets-Sheet 1
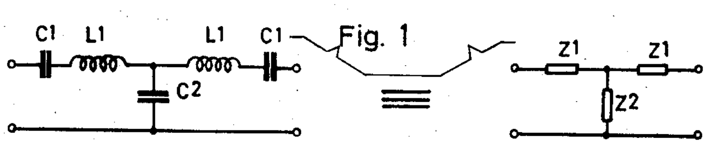
Fig. 1
Fig. 2 Fig. 3 Fig. 4
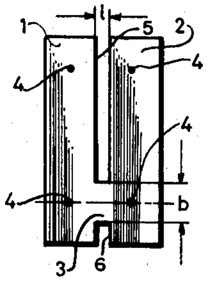
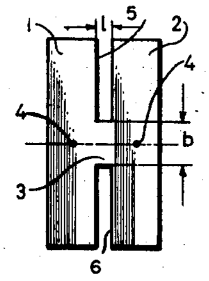
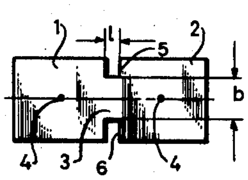
Fig. 5
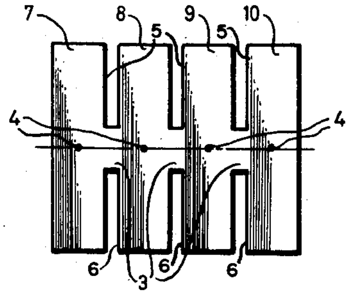
Fig. 6
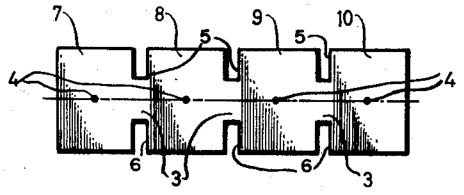
Inventor.
Franz Schöfer.
By [signature] Atty.

April 16, 1963 F. SCHÖFER 3,086,183

ELECTROMECHANICAL FILTER

Filed June 1, 1959 2 Sheets-Sheet 2

Inventor:
Franz Schöfer
By [signature] Atty 3,086,183

ELECTROMECHANICAL FILTER

Franz Schöfer, Berlin-Siemensstadt, Germany, assignor to Siemens and Halske Aktiengesellschaft Berlin and Munich, a corporation of Germany Filed June 1, 1959, Ser. No. 817,355
Claims priority, application Germany Apr. 14, 1959
1 Claim. (Cl. 333—72)

This invention relates to an electromechanical filter and is particularly concerned with an improvement on the disclosure of the copending application Serial No. 816,316, filed May 27, 1959, owned by the same assignee, relating to an electromechanical filter with piezoelectric drive, comprising for the coupling of the individual resonators mechanical coupling members which are subjected to shearing stresses.

The structure described in the copending application produces considerable advantages as compared with previously known filters, namely, the space required and the binding action of the entire arrangement can be reduced, and, with given value of the band width, the basic damping within the transmission range may be kept low.

The object of the invention is to considerably simplify the filter and to increase the accuracy in obtaining certain electrical values.

The invention realizes this object, proceeding from the filter described in the copending application, by making the respective resonators and coupling members of one piece, recesses or cutouts being formed in such piece to subdivide it into resonator members and coupling members, respectively.

Mechanical problems are in this manner reduced to a minimum and the oscillating body with predetermined selective properties, mounted in a holder or carrier, for example, a carrier for an oscillating quartz, can be assembled as a structural element with electrical switching elements required for matching and auxiliary filter selection.

The various objects and features of the invention will appear in the course of the description which will be rendered below with reference to the accompanying drawings showing embodiments thereof. In the drawings, FIG. 1 shows a known electrical four-pole substitution circuit of a coupling filter without electrical terminal circuits;

FIG. 2 shows an oscillation system consisting of two transverse or bending oscillators disposed in a common plane;

FIG. 3 illustrates an oscillation system consisting of two longitudinal oscillators;

Figure 7:
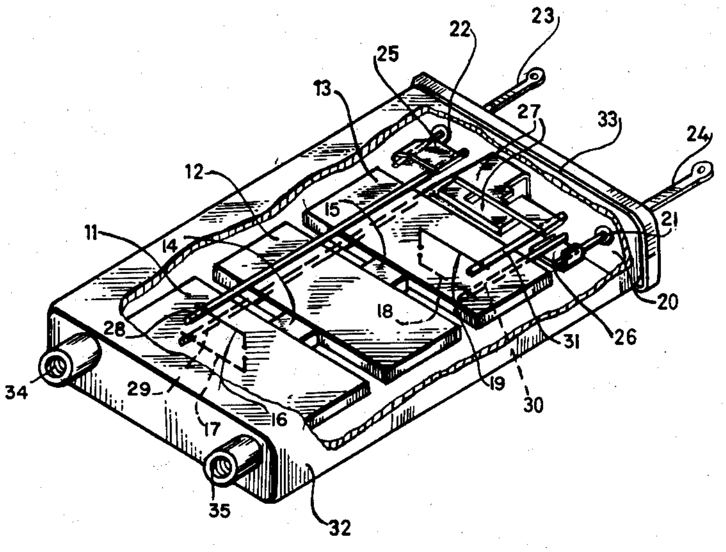

FIG. 4 indicates in connection with a two circuit filter the manner of disposing the bridge so as to secure a pure shearing coupling;

FIGS. 5 and 6 illustrate examples of four-circuit filters; and

FIG. 7 shows a three-circuit filter employing the teaching according to the invention.

In FIG. 1, Z1 is the characteristic impedance of the resonator elements and Z2 is the characteristic impedance of the coupling element. So far as theoretical considerations are concerned, it will suffice to refer to pertinent literature, for example, to the periodical "Frequenz," 1958, issue 8, pages 246–255. The coupling factor K of such a filter is proportional to the characteristic impedance ratio $Z1/Z2$, and the relative frequency band width is proportional to the coupling factor K. It will therefore be seen that the coupling factor constitutes an essential factor in the dimensioning of a filter of the initially described type.

The coupling factor K is obtained mechanically by the coupling member described in detail in the copending application, such coupling member securing the desired coupling between successive resonators by shearing. However, while these coupling members form in the copending application separate parts, in accordance with the invention, the entire mechanical oscillation system consists of one piece.

In the embodiment according to FIG. 2, the oscillation system consists of two transverse or bending oscillators 1 and 2 lying in a common plane. The coupling is effected by way of a bridge 3 disposed between the bending oscillators 1 and 2. The oscillation nodes of the transverse or bending oscillators are indicated by the dots marked by numeral 4.

The entire arrangement may, for example, be produced by taking a plate of piezoelectric material, for example, a quartz plate of desired size, forming the cutouts 5 and 6 therein and thereafter forming in known manner the transverse oscillators 1 and 2 with the required dimensions. The intercoupling may be determined as desired by the orientation of the bridge 3 relative to the oscillation node of the transverse oscillator and by the dimensions of the bridge. The bridge 3 will generally be disposed symmetrically to the straight line determined by the neighboring oscillation node 4. A journalling of the two transverse oscillators 1 and 2, free of reactive forces is made possible by soldering the connecting wires at the nodal points. The coupling factor K is in this embodiment with given dimensions of the resonators a function of the width *b*, the length of the bridge and the thickness of the bridge. For reasons of mechanical simplification, the thickness of the bridge will generally correspond to the thickness of the oscillators 1 and 2.

FIG. 3 illustrates the teaching of the invention as applied in connection with two longitudinal oscillators 1 and 2. The bridge 3 is again positioned symmetrically relative to the straight line determined by the oscillation node 4.

FIG. 4 shows the manner of positioning the bridge 3 in the case of a two-circuit filter comprising two plane-shearing oscillators 1 and 2 so as to secure a pure shearing coupling. So far as the dimensions of the bridge 3 are concerned, the same considerations apply for FIG. 4, and for FIG. 3, as explained with reference to FIG. 2.

FIGS. 5 and 6 show the teaching of the invention applied, for example, in the case of four-circuit filters.

The filter arrangement according to FIG. 5 consists of four coupled longitudinal oscillators 7, 8, 9, 10 which are coupled by way of bridges 3, in a manner similar to the coupling in the construction of FIG. 3.

In the embodiment according to FIG. 6, the four resonators 7, 8, 9 and 10 consist of plane-shearing oscillators, which are constructed according to FIG. 4. A detailed explanation is therefore omitted.

The coupling factor may be varied within wide limits by proper orientation and dimensioning of the crystal as well as dimensioning of the bridge 3. A considerable advantage of the structure of a filter according to the invention resides in the fact that the resonators need not operate, as illustrated, within the basic oscillation but also with a higher harmonic oscillation. There is complete freedom so far as the construction and dimensioning of the individual resonators is concerned; it is, for example, possible to use by proper orientation of the crystal oscillating body to the crystallographic axes a suitable cut for an optimum frequency course. It is likewise possible to effect the placement of the exciting electrodes on the end resonators, for example, in the embodiments according to FIGS. 5 and 6, the resonators 7 and 10, as well as the contacting and the mounting in the nodal planes, in a manner known from piezoelectric resonators.

FIG. 7 shows an example of a three-circuit filter employing the teaching of the invention. Numerals 11, 12 and 13 indicate three no-plane-shear resonators operating as longitudinal resonators, which are interconnected by bridges 14 and 15 serving as coupling members. The three longitudinal oscillators 11, 12, 13 and the two bridges 14, 15 consist of a quartz plate. The longitudinal oscillators are on both sides in known manner provided with a thin gold coating. The gold coatings of the longitudinal oscillators 11 and 13 serve respectively as filter input and output terminals. Short resilient spring members 16, 17, 18, 19, approximately bent at right angle, are for this purpose soldered to the respective gold coating of the longitudinal oscillators 11, 13 at the nodal points thereof. These spring wire members are fastened to the mechanical carrier system serving for the electrical connection, thus carrying the quartz plate.

The mechanical carrier system consists in the embodiment according to FIG. 7 of a cover plate 20 in which are in insulated manner secured by means of glass seals 21, 22, two leads 23, 24. To the leads 23, 24 are respectively welded metallic strips 25 and 26. A metallic bracket 27 having lateral ears is welded to the cover plate 20. Heavier wires 28, 29, 30, 31 are respectively welded to metallic strips 25, 26 and to the lateral ears of the metallic bracket 27. The wires 28, 29 extend to the end of the quartz plate while the wires 30, 31 extend approximately only to the level of the bridge 15. To the respective wires 28, 29, 30, 31 are soldered the previously mentioned wire springs 16, 17, 18, 19 which are in turn soldered to the thin gold coatings at the nodal points of the longitudinal oscillators 11 and 13.

The stable filter system constructed in this manner is inserted into a metallic envelope 32 which is closed by the cover plate 20. The overlapping margin 33 of the cover plate 20 is suitably soldered to the metallic envelope. The filter system is in this manner hermetically sealed against contamination and exterior influences. Threaded bushings 34, 35 are provided on the metallic envelope 32 by soldering or spot welding for fastening the filter in position in an apparatus in which it is to be used.

The electrical input of the filter is formed by one of the conductive leads 23, 24 and the metallic envelope 32 (or the cover plate 20) while the electrical output is disposed between the other conductive lead and the envelope. A modification is possible by insulating the metallic bracket 27 with respect to the cover plate 20. The terminal which is common to the filter input and filter output may be carried outwardly, for example, by means of an insulated lead.

Changes and modifications may be made within the scope and spirit of the appended claim which defines what is believed to be new and desired to have protected by Letters Patent.

I claim:

An electromechanical filter with piezoelectrical drive, comprising a planar piezoelectrical member having cutouts formed therein subdividing it into a plurality of no-plane-shear resonators, each respectively coupled to the adjacent resonator by a mechanical element integral therewith and subjected to shearing stresses, thin conductive coatings carried by said resonators, relatively thin L-shaped resilient wires soldered to said coatings in a nodal plane of the resonators, the soldered portions of said wires extending normal to said planar member and the remaining portions extending parallel thereto, a supporting member, and a plurality of metallic strips extending parallel to said planar member and transverse to said parallel portions of the respective wires, and operatively connecting the latter portions and said supporting member to support said resonators therefrom and form terminal means for said resonators.

References Cited in the file of this patent

UNITED STATES PATENTS

| | | |
|---|---|---|
| 2,276,013 | Bohannon | Mar. 10, 1942 |
| 2,292,886 | Mason | Aug. 11, 1942 |
| 2,358,087 | Lane | Sept. 12, 1944 |
| 2,493,145 | Jaffe | Jan. 3, 1950 |